April 1, 1941.　　　H. T. LAMBERT　　　2,237,234
BRAKE CONSTRUCTION
Filed March 2, 1940　　　3 Sheets-Sheet 1
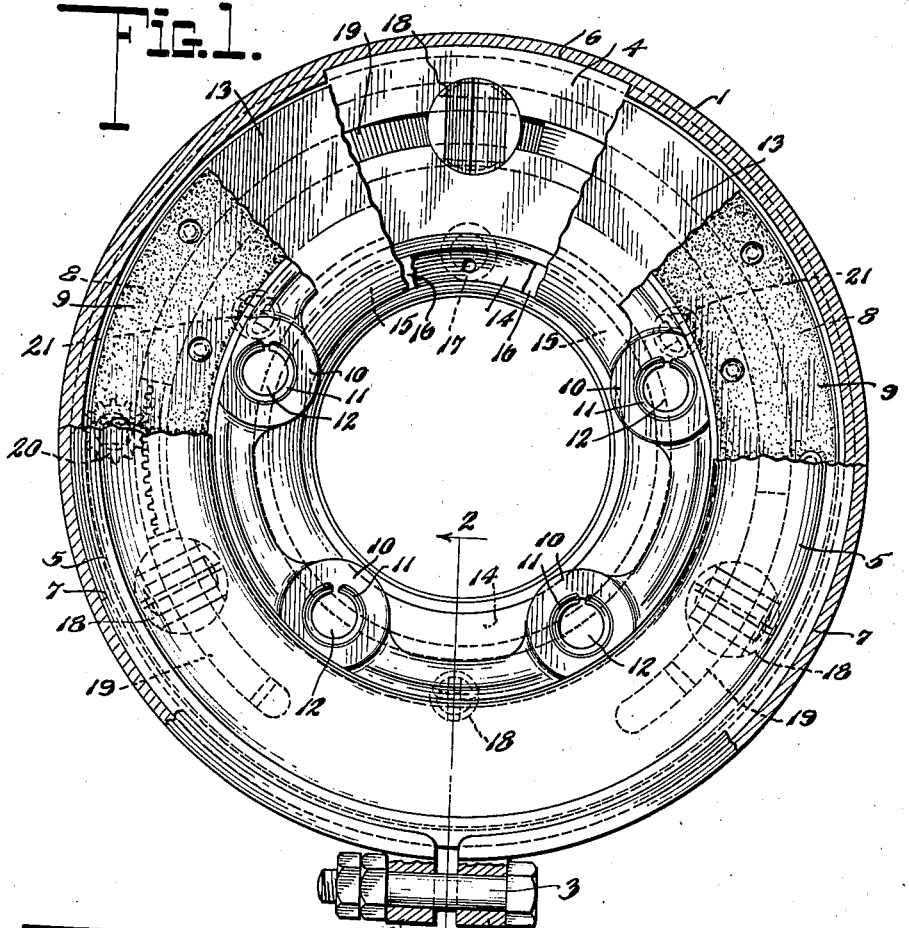
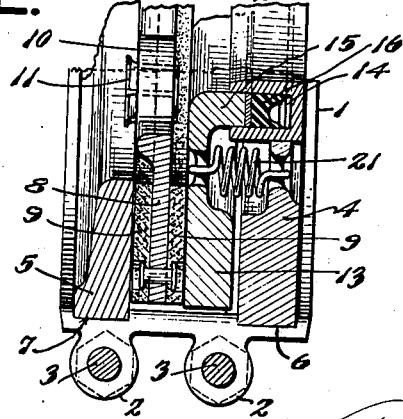
Inventor
H.T.Lambert
By Robb & Robb
Attorneys April 1, 1941.   H. T. LAMBERT   2,237,234
BRAKE CONSTRUCTION
Filed March 2, 1940   3 Sheets-Sheet 2
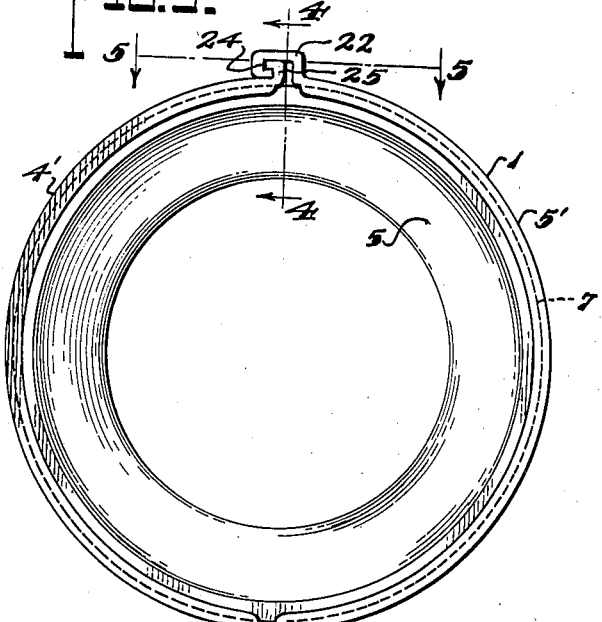
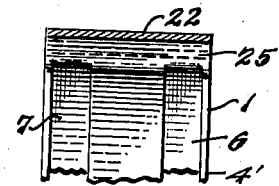
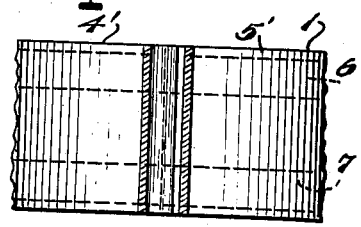
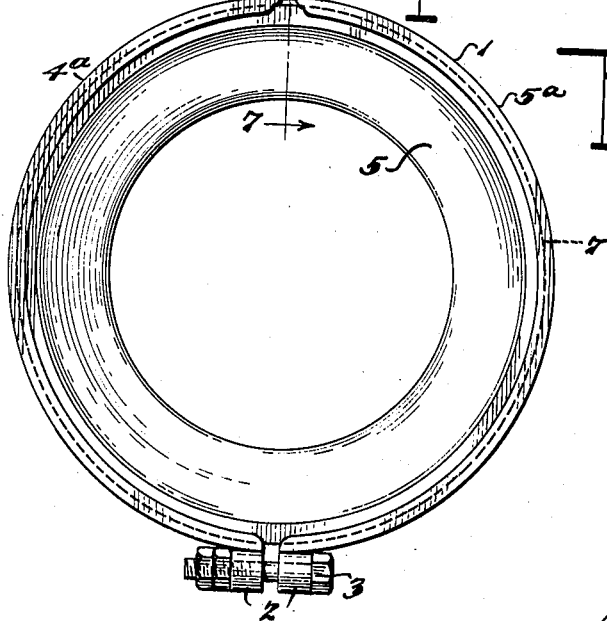
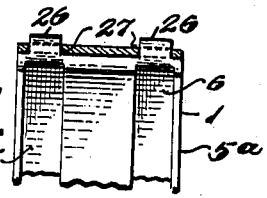
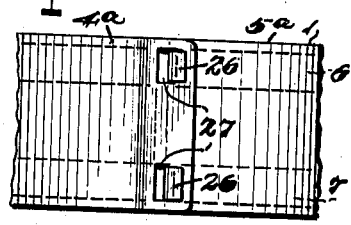
Inventor
H. T. Lambert
By Robb & Robb
Attorneys April 1, 1941.   H. T. LAMBERT   2,237,234
BRAKE CONSTRUCTION
Filed March 2, 1940   3 Sheets-Sheet 3
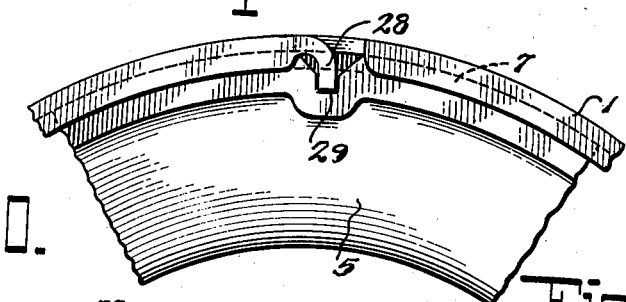
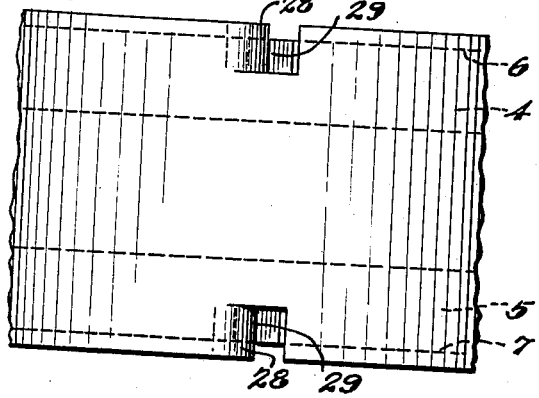
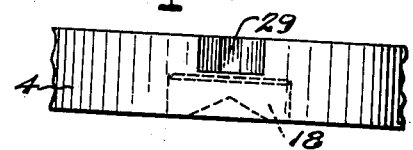
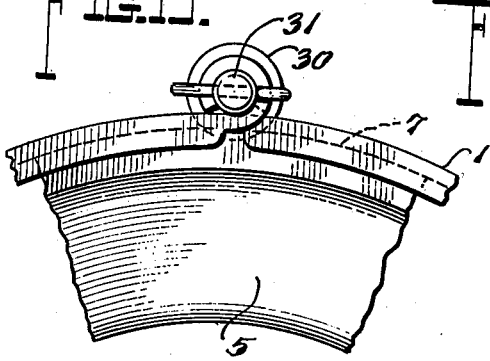
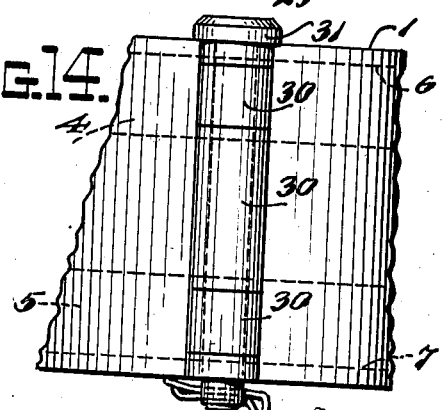
Inventor
H. T. Lambert
By Robb & Robb
Attorneys Patented Apr. 1, 1941

2,237,234

UNITED STATES PATENT OFFICE 2,237,234

BRAKE CONSTRUCTION

Homer T. Lambert, St. Joseph, Mich.

Application March 2, 1940, Serial No. 322,029

10 Claims. (Cl. 188—72)

The present invention relates to improvements in brake construction, adapted for automotive vehicles, and has particular reference to a novel arrangement of a brake assembly parts by means of which said parts may be quickly assembled and disassembled and adequately protected in use.

More specifically, it is the object of these improvements to provide a separable housing for the brake instrumentalities disposed therein, said housing being formed with seats to accommodate and fixedly clamp certain of the stationary parts by the connection of the sections of the brake housing.

The particular brake herein set forth, as a brake, is disclosed and claimed in my copending application, Serial No. 322,028, filed March 2, 1940, and therefore the disclosure herein is more or less directed to the assembly means forming the subject matter of the appended claims and drawings, in which—

Figure 1 is a view in elevation with parts broken away and shown in section to more clearly illustrate the details of the complete brake mechanism;

Figure 2 is an enlarged sectional view on the line 2—2 of Figure 1;

Figure 3 is a detail view in side elevation of a modified form of brake housing in which the housing is constructed of two sections having a special quick detaching interlocking connection at a point spaced from the clamping extremities;

Figures 4 and 5 are detail sectional views taken at right angles to each other, and on the lines 4—4 and 5—5, respectively, of Figure 3;

Figure 6 is a view similar to Figure 3, but having a still further modified form of interlocking connection;

Figure 7 is a detail sectional view on the line 7—7 of Figure 6;

Figure 8 is a top plan view of the construction shown in Figure 6;

Figure 9 is a detail fragmentary view showing a further modification of connection of the housing of the brake device with stationary discs forming part of the brake instrumentalities;

Figure 10 is a top plan of the construction shown in Figure 9;

Figures 11 and 12 are detail fragmentary views of the stationary discs of the brake mechanism showing in plan view the formation of these discs with recesses to receive the interlocking casing or housing projections;

Figure 13 is a fragmentary view in elevation of a further form of housing connection in which the housing sections are connected by a pintle, and Figure 14 is a top plan view of the pintle construction shown in Figure 13.

Like reference characters designate corresponding parts in the several figures of the drawings.

Specifically describing the preferred construction of brake device, and referring first to Figures 1 and 2 of the drawings, the numeral 1 designates the brake housing in the form of a split band of resilient material having the offset lugs 2 arranged in pairs and in spaced relation as regards the pairs, as most clearly shown in Figure 2, to receive the clamping bolts 3.

It is to be understood that the brake device shown in connection with this disclosure is of the disc type and includes what I term for purposes of this description a backing plate or disc 4 and a stationary brake or friction disc 5 arranged in spaced relation to each other and received in the respective grooves 6 and 7 formed in the interior face of the brake casing 1. It will be apparent that the housing clamps these discs 4 and 5 in their seats and holds them stationary in the functioning of the brake instrumentalities of which they form a part. Intermediate the two discs is arranged the rotary brake ring 8 having friction facings 9 at opposite sides thereof and spaced driving lugs 10 receiving the cushioning thimbles 11 for mounting upon stud bolts 12 which are carried by the vehicle wheel hub (not herein shown).

Intermediate this braking ring 8 and the fixed disc 4 is disposed the free floating pressure plate or disc 13, which is adapted to be actuated in an axial direction to establish frictional contact with the braking ring 8 and between the braking ring 8 and the fixed brake disc 5. The primary actuating means illustrated is of the hydraulic type, and, therefore, the disc 4 is channeled, at 14, to receive the annular flange 15 and flexible ring 16. The hydraulic pressure fluid enters the channel 14 through a lateral port 17 for actuation of the power disc or plate 13 in the manner stated, and is described in the companion application hereinbefore referred to.

In the construction shown in Figure 1, servo energizing means composed of a series of pairs of disc inserts 18 are employed to produce auxiliary pressure upon the pressure plate 13 incident to the application of torque produced by rotation of the braking ring 8, and these several camming inserts are adjusted by means of an annular ring member 19 which is in turn rotated by a pinion 20 for taking up wear and adjusting the braking parts as regards clearances therebetween. The disc 13 is normally held in retracted position away from the braking ring 8 by means of a series of springs 21.

It will be obvious that the assembly of the brake instrumentalities within the housing 1 is greatly facilitated by the use of the split housing and interlocking of the plates or discs 4 and 5 referred to in the foregoing description.

Similarly, this assembly or disassembly of the brake construction is greatly facilitated by the modified forms of the casing or housing now to be described. In that form of construction shown in Figure 3, the brake housing is constructed of two parts 4', 5', and the end of the section 5' opposite the clamping lug 2 is offset, as indicated at 22, and rebent, at 24, to form a hook for interengaging with the rebent extremity 25 of the opposite section 4'. In this construction, the interlocking ends are disengaged readily upon loosening of the clamping bolts connecting the opposite ends of the casing sections.

In Figure 6, I have modified this interlocking connection above referred to by providing the section 5a with a rebent hook 26 at each side thereof to engage in the apertured extensions 27 of the companion section 4a.

Instead of connecting the ends of the two section housings together in the manner referred to in connection with Figures 3 and 6, the casing is split in connection with the form illustrated in Figures 9 to 12, and at a point substantially opposite the split the band is slit laterally from either side and circumferentially to thereby form short tongues 28, which are bent inwardly and each engaged in a recess 29, 29, one in the periphery of the backing plate 4, and the other in the stationary brake disc 5.

This peripheral interlock establishes a predetermined circumferential arrangement of the interengaging parts, and in a similar manner the grooves 6 and 7 in the housing establish a fixed lateral relationship of the stationary brake instrumentalities.

In the last form of casing construction, as shown in Figures 13 and 14, the housing is constructed of two sections and their contiguous ends rolled back to form pintle eyes 30, and the introduction of the pintle 31 thereinto establishes a hinge connection for the housing sections.

It is important to note from the foregoing that I am enabled to dispense with the use of transverse connecting bolts, heretofore utilized to connect the stationary discs or plates of the brake unit together, thereby eliminating weakening of these members which are subjected to tremendous stresses in the braking operation, and the time and labor of accurately drilling registering apertures in said parts is also done away with.

With the arrangements herein disclosed, the assembly and disassembly of the brake constructions becomes a simple and quick operation capable of being performed by unskilled labor.

While the specific details of construction have been herein shown and described, the invention is not confined thereto as alterations may be made without departing from the spirit thereof as defined by the appended claims.

Having thus described my invention, what I claim as new and desire to secure by Letters Patent is:

1. A brake construction of the class described including spaced stationary discs, and a housing therefor having means establishing an interlocking engagement between the housing and the discs, and means for clamping the housing about the discs to hold the latter in their interlocking relationship.

2. A brake construction of the class described including spaced stationary instrumentalities, one of said instrumentalities consisting of a brake element, and the other a backing plate, braking means between said stationary instrumentalities comprising a rotary member to be braked and a pressure element for shifting said rotary member into braking relation to the stationary brake element aforesaid, and a housing having interlocking grooves to receive and maintain said instrumentalities in a fixed relation to each other, and means for holding the housing and instrumentalities in the interlocked relationship.

3. A brake construction as set forth in claim 1, wherein the housing is formed with transversely spaced seats to receive the discs, and clamping bolts are provided to hold the discs fixedly in said seats.

4. A brake construction of the class described comprising a split housing or drum having a grooved seat about its inner periphery, braking instrumentalities mounted in said drum including a relatively stationary plate engageable in the seat aforesaid, and clamping means connecting the ends of the housing together and establishing an interlock of the plate with its seat.

5. A brake construction as set forth in claim 4, wherein the housing is composed of complemental sections the contiguous ends of which are formed with separable interlocking connecting elements held in interengaging relation by the clamping means.

6. A brake construction as set forth in claim 4, wherein the housing is composed of complemental sections forming an open-ended drum, one end of one section having a hook element and the associated end of the other section having a lug interengageable by the hook element to provide separable sections held in clamped position about the brake instrumentalities by the clamping means.

7. A brake construction of the class described comprising a split band having spaced annular grooves in its inner periphery forming disc receiving seats, brake instrumentalities including a pair of stationary discs or plates arranged in said seats in spaced relation, and clamping bolts connecting the band ends together and fixedly holding the discs in their seats.

8. A brake construction as set forth in claim 7, wherein the band is provided with a tongue or lug between its ends extending laterally into a recess in one of said discs.

9. A brake construction as set forth in claim 7, wherein the band is provided with a torque slit from each side of the band at points spaced from its ends, and the stationary discs are formed with a recess to receive the tongues for interlocking the discs against circumferential movement relative to the band.

10. A brake construction as set forth in claim 7, wherein the band is split at a point intermediate its ends and provided with pintle receiving eyes and a pintle therein to provide a hinge connection between the band sections.

HOMER T. LAMBERT.